US006988182B2

(12) United States Patent
Teachman et al.

(10) Patent No.: US 6,988,182 B2
(45) Date of Patent: Jan. 17, 2006

(54) METHOD FOR UPGRADING FIRMWARE IN AN ELECTRONIC DEVICE

(75) Inventors: Michael E. Teachman, Victoria (CA); Martin A. Hancock, Victoria (CA); Catherine A. Duncan, Victoria (CA); Benedikt T. Huber, Victoria (CA)

(73) Assignee: Power Measurement Ltd. (CA)

( * ) Notice: Subject to any disclaimer, the term of this patent is extended or adjusted under 35 U.S.C. 154(b) by 591 days.

(21) Appl. No.: 10/075,080

(22) Filed: Feb. 13, 2002

(65) Prior Publication Data

US 2003/0154471 A1 Aug. 14, 2003

(51) Int. Cl.
*G06F 9/318* (2006.01)

(52) U.S. Cl. .......................................... 712/37; 712/38

(58) Field of Classification Search .................. 712/37, 712/38; 710/68

See application file for complete search history.

(56) References Cited

U.S. PATENT DOCUMENTS 5,838,996 A * 11/1998 deCarmo .................... 710/68
5,854,841 A * 12/1998 Nakata et al. .............. 713/152
5,901,310 A 5/1999 Rahman et al. ............. 395/651
6,058,210 A * 5/2000 de Queiroz et al. ......... 382/232
6,078,541 A * 6/2000 Kitagawa et al. ...... 365/230.01
6,104,506 A * 8/2000 Hirokawa .................. 358/444
6,128,094 A * 10/2000 Smith ...................... 358/1.15

FOREIGN PATENT DOCUMENTS

JP 128605 5/1997
JP 137617 5/2000
WO WO 01/01154 A1 1/2001

OTHER PUBLICATIONS

ION® Technology Meter Shop User's Guide, Power Measurement, pp. 1–48, Revision Date May 10, 2001.
Zlib 1.1.3 Manual, Copyright© 1995–1998 Jean–loup Gailly and Mark Adler, pp. 1–15.
P. Deutsch, Aladdin Enterprises J–L. Gailly, "ZLIB Compressed Data Format Specification version 3.3", May 1996, pp. 1–10.
P. Deutsch, Aladdin Enterprises, "DEFLATE Compressed Data Format Specification version 1.3", May 1996, pp. 1–15.
Zlib software License, Copyright© 1995–1998 Jean–loup Gailly and Mark Adler, p. 1 of 1.

* cited by examiner

*Primary Examiner*—Eric Coleman
(74) *Attorney, Agent, or Firm*—Brinks Hofer Gilson & Lione

(57) ABSTRACT

An improved method of upgrading the firmware of an electronic device is disclosed. The method is executed over a communications link. The method includes compression of a portion of the new firmware, but does not require the device to have any pre-existing decompression algorithms built into it. A system and device capable of executing the method is also disclosed.

48 Claims, 4 Drawing Sheets

METHOD FOR UPGRADING FIRMWARE IN AN ELECTRONIC DEVICE

BACKGROUND

Intelligent electronic devices ("IED's") such as programmable logic controllers ("PLC's"), Remote Terminal Units ("RTU's"), electric/watt hour meters, protection relays and fault recorders are widely available that make use of memory and microprocessors to provide increased versatility and additional functionality. Such functionality includes the ability to communicate with remote computing systems, either via a direct connection, e.g. modem, or via a network. These devices often include firmware or operating software/programs which is built or programmed into the device and which directs the microprocessor and other hardware to perform the desired functions of the IED.

The capability to upgrade the firmware of an IED is a desirable feature due to the fact that firmware is often being continually refined by the original manufacturer even after the product has been sold. Updates may be desirable to add or remove functions, or fix problems with the existing firmware. Often, the device is installed in a place that is difficult to access, so it is desirable to be able to upgrade the device remotely from a computer or other computing device by transferring the new firmware code via a communications link, such as an Ethernet, RS-485, RS-232, modem, or other form of wired or wireless link.

However, these communications links typically have a limited amount of available bandwidth. Therefore, if the device is complex and the firmware it uses is large, it may take a significant amount of time to transfer the upgraded firmware to the device. This is particularly undesirable when there is a usage charge for the communications link (such as long distance telephone charges) or the user has a large number of similar devices to upgrade. Further, where the communications link is unreliable, longer transmission times provide more opportunity for errors to be introduced into the transmission or for the transmission to be interrupted. In addition for some devices, the device is typically unavailable for normal operation during upgrade, therefore a shorter upgrade time is desirable to prevent unnecessary device downtime.

In addition, it is common for firmware on a device to be stored in non-volatile storage (such as a Flash EEPROM or hard disk drive), but transferred to a faster type of memory (typically a volatile memory such as DRAM) for execution. Therefore, the larger the firmware, the more non-volatile storage is required. Typically, the amount of non-volatile storage required is determined during the design of the device. While the designer may attempt to predict future needs, they must balance future upgrade capability against present costs. If it is desired to add to or otherwise modify the firmware later on such that the upgraded firmware is larger than the non-volatile storage can store, it may not be possible to upgrade the device.

Firmware within an electronic device often consists of a boot portion stored in a boot sector of a flash EEPROM, or other non-volatile device, and a main portion stored in the remainder of the flash EEPROM. The boot portion is typically used to start-up and/or initialize the device upon application of operating power and load and cause execution of the remaining firmware. It is often undesirable to upgrade the boot portion since if there is a failure (such as a power outage or code bug) when the boot portion upgrade is in progress, the device may be rendered inoperable.

In one known system, the upgraded firmware is transmitted to the device in a compressed form. The device then decompresses the upgraded firmware using a built in decompression routine or dedicated decompression hardware. However, this requires that the device be capable of decompressing the compressed upgrade firmware data. For devices already installed in the field, this would require that the device be retrofitted to add the decompression routine. Requiring this type of retrofitting would be disadvantageous.

Accordingly, is it an object of the present invention to provide a system that overcomes the disadvantages of the prior art by providing a faster method of upgrading the firmware in an electronic device while reducing its storage requirements. Further, it is another object of the invention to maintain backwards compatibility with existing installed devices without requiring prior modification to utilize the disclosed upgrade method.

SUMMARY

The present invention is defined by the following claims, and nothing in this section should be taken as a limitation on those claims. By way of introduction, the preferred embodiments described below relate to a method of altering firmware of an electronic device including a processor and a non-volatile memory, the firmware including first data stored in the non-volatile memory. In one embodiment, the method includes receiving second data by the electronic device. The second data includes an uncompressed portion and a compressed portion. The uncompressed portion further includes a decompression program. The method further includes storing at least the compressed portion in the non-volatile memory, removing at least one portion of the first data from the non-volatile memory, decompressing the compressed portion using the decompression program, and executing the firmware by the processor, the firmware further including at least the decompressed compressed portion.

The preferred embodiments further relate to a system for upgrading the firmware of an electronic device. In one embodiment, the system includes a computing device comprising at least a first processor and a storage device. The system further includes a communications link coupled between the computing device and the electronic device. The electronic device includes a non-volatile memory comprising first firmware and a second processor. The computing device further includes second firmware stored on the storage device, the second firmware including a compressed portion and an uncompressed portion. Wherein, the computing device is operative to transfer the second firmware to the electronic device via the communications link and the second processor is operative to execute the uncompressed portion in order to decompress the compressed portion. Further, the compressed portion replaces at least a portion of the first firmware in the non-volatile memory.

Further aspects and advantages of the invention are discussed below in conjunction with the preferred embodiments.

DETAILED DESCRIPTION OF THE PRESENTLY PREFERRED EMBODIMENTS

Figure 1:
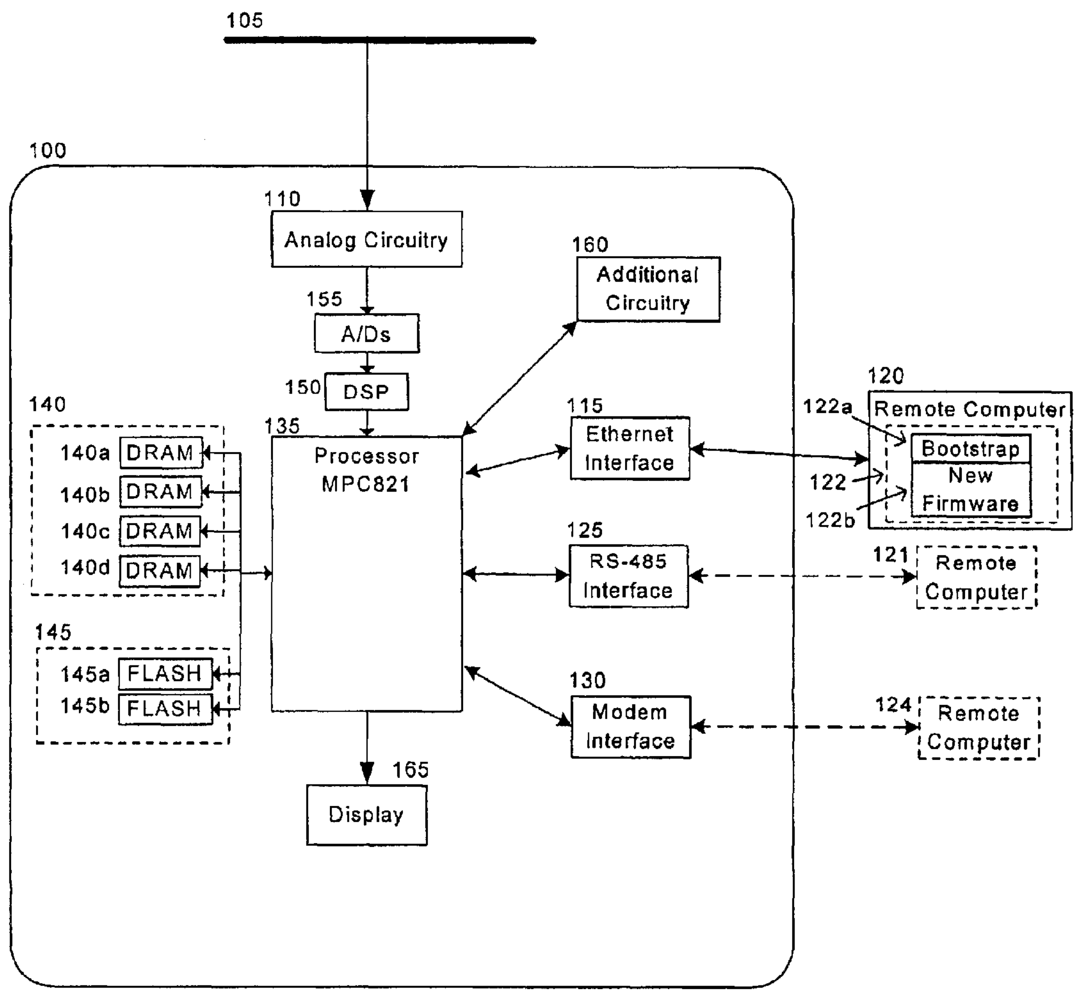
FIG. 1 illustrates a block diagram of a system according to one embodiment.

The present invention relates to a method of upgrading the firmware of an intelligent electronic device ("IED") containing a processor and an in-system modifiable non-volatile memory. The non-volatile memory is used for the storage of code to be executed by the processor. Such in system modifiable non-volatile memories may include Flash EEPROM, battery backed SRAM, or ferro-electric memories typically referred to as FRAM or MRAM, or other non-volatile memories now available or later developed. An exemplary device incorporating the disclosed embodiments is a digital power meter, however it will be appreciated that the disclosed embodiments are applicable to other suitable electronic devices. The method reduces upgrade/data transfer time and required memory storage using compression, but does not require that the previous firmware existing on the device contain and/or have the ability to execute compression/decompression algorithms. Further, the disclosed method of upgrading the firmware of an electronic device reduces the amount of time to upgrade the device, saves spaces in the non-volatile memory of the device and requires no modification to the hardware or firmware of the pre-existing device before execution of the method.

The disclosed system and method of upgrading the firmware of the electronic device utilizes compression of a portion of the new firmware being sent to the device over a communications link. The device need not incorporate any of the algorithms necessary for decompressing the firmware before the execution of the method. The firmware existing on the device before the execution of the method treats the upgrade firmware in the same manner whether it contains compressed firmware or not. The upgrade firmware consists of a compressed portion and an uncompressed portion.

The upgrade firmware containing the compressed portion and the uncompressed portion is transferred to the electronic device from a computer or similar computing device over a communications link. The upgrade firmware replaces the pre-existing firmware in the non-volatile memory of the electronic device. When execution of the upgrade firmware on the electronic device begins, the upgrade firmware is transferred into volatile memory at the same location in the volatile memory that the pre-existing firmware was copied previously and the uncompressed portion is executed in volatile memory. The uncompressed portion copies the upgrade firmware to a new location and continues execution from this new location. As execution continues, the uncompressed portion decompresses the compressed portion and transfers this decompressed version to the same location in the volatile memory that the pre-existing firmware was copied to. Execution of the decompressed version of the compressed portion then begins as though the decompressed version was never compressed.

The compressed portion of the upgrade firmware once decompressed, could be identical to the pre-existing firmware, which would result in identical device operation while saving space in the non-volatile memory.

Remotely upgrading firmware is known in the art such as that described in the document entitled "Meter Shop User's Guide", published by Power Measurement Ltd., located in Saanichton, B.C., Canada, at page 40, which describes a procedure for upgrading digital power meters manufactured by Power Measurement Ltd.

Further, U.S. patent application Ser. No. 09/931,527, "APPARATUS AND METHOD FOR SEAMLESSLY UPGRADING THE FIRMWARE OF A INTELLIGENT ELECTRONIC DEVICE", filed Aug. 15, 2001 (pending) describes an alternate method of firmware upgrade.

U.S. Pat. No. 5,901,310 describes the compression of firmware within a device for the purpose of reducing storage needs, but does not disclose any methods of upgrading the firmware existing in the system. In particular, the firmware contained within the device disclosed in this patent is not upgradeable without physically removing the memory from the device and replacing it with another memory having the upgraded firmware.

In addition, self-extracting archives are known in the art for reducing the amount of storage occupied in a computer's hard drive. However, the executable portion of such archives execute in concert with a computer's operating system. The computer must be operating and executing at least the firmware (often called the BIOS) and the operating system before a self extracting archive can execute. Further, self-extracting archives execute to decompress their contents onto the computer's hard drive and not directly into executable memory. Therefore they are not applicable to the upgrade of a device's firmware due to the fact that firmware is the lowest level of the device's operating code and cannot depend on the presence of an operating system. Further, firmware must be executed from executable memory. The upgrading of the firmware (often called the BIOS) of a computer is normally done by executing a program in the computer's RAM which accesses an upgrade file on a hard (or floppy) drive and programs this upgrade code into the flash memory based BIOS on the motherboard of the computer. The upgrade file on the drive may be a result of a self extracting executable's execution, but it must be extracted before the upgrade process begins. Typically, once a self extracting archive is extracted, the source file is discarded. In contrast, the disclosed system and method provides for a firmware upgrade which replaces the existing firmware in the device with a version which extracts itself on the commencement of device operation directly into executable memory thereby alleviating the need for decompression to an intermediate storage medium prior to execution. The compressed firmware is retained for use during the next device startup.

In the exemplary digital power meter, the firmware is used to facilitate the operation of the power meter. Some of the key functions of the firmware code include calculation code for calculating power parameters such as volts, amps, kW, kVAR, kVA, kWh, kVARh, kVAh, frequency, power factor, harmonics, etc., communications code for facilitating communication with external devices, user interface code for allowing the user to interact with the digital power meter through its display and object oriented modular code for adding user configurability to the power meter as described in U.S. Pat. No. 5,650,936.

FIG. 1 shows the structure of a system capable of implementing the disclosed embodiments. The system includes an exemplary digital power meter 100. The exemplary digital power meter 100 may include advanced features such as measurements, clamp-on current transformer ("CT") options, scheduled or Event driven logging, sequence/of/events and min/max logging, set-pointing on any parameter or condition, 1 second and ½ cycle setpoint operation, up to 16 digital inputs for status/counter functions, 7 relay outputs for control/pulse functions and optional analog inputs and outputs. It will be appreciated that other features may also be provided. For clarity, some components of the power meter 100 have been omitted in the Figures. The meter 100 is capable of receiving uncompressed firmware upgrades via the communications interface 115. This capability includes the capabilities in the existing firmware to establish a communications link with a remote computer 120, 121, 124, as described below, and receive, install and execute an uncompressed firmware upgrade to cause replacement or modification of the existing firmware.

The Measurement features may further include exceeding class 0.2 revenue accuracy, instantaneous 3-phase voltage, current and power factor; it also includes bi-directional, absolute, net, time-of-use and energy loss compensation measurements, sliding window demand, as well as predicted and thermal demand. Individual and total harmonic distortion up to the $63^{rd}$ harmonic is measured, as well as transient detection at 65 ms@60 Hz (78 ms@50 Hz) and sag/swell measurements. Finally, the measurements also include clamp-on current transformer measurements. Further, the power meter preferably includes at least one communications feature operable with the disclosed embodiments such as a built in modem, 10BaseT and/or 10BaseFL Ethernet ports, one or more RS-485 ports, which may be switchable to RS-232, front panel optical port and/or support for the ION®, Modbus™ and/or DNP 3.0 communications protocols. An exemplary digital power meter is the model "ION 7600" manufactured by Power Measurement Ltd., located in Saanichton, British Columbia, Canada.

The digital power meter 100 is coupled with an electric circuit 105 via analog interface circuitry 110 for the purpose of monitoring and/or managing one or more parameters of the electric circuit. Herein, the phrase "coupled with" is defined to mean directly connected to or indirectly connected through one or more intermediate components. Such intermediate components may include both hardware and software based components. The digital power meter 100 is also capable of connecting to a remote computer 120 using a communications interface 115, 125, 130. The communications interface 115 is preferably a 10BaseT Ethernet interface, but one or more alternate communications interfaces 125 130 such as 10BaseFL, 100BaseT, gigabit Ethernet, RS-232, RS-485, modem, and wireless links may also be provided in addition to or in lieu of a 10BaseT Ethernet interface. In one embodiment, the remote computer 120 contains a copy of upgrade firmware 122 for the digital power meter 100. It will be appreciated that the interface 115, 125, 130 may also include communication over the internet. The remote computer 120, 121, 124 is preferably a standard desktop PC, but may also include a server, PDA, portable PC, or any other microprocessor based computing device capable of storing the requisite data and communicating with the power meter 100 via the communications interface 115, 125, 130. The remote computer 120 121 124 may be located at a utility, customer and/or manufacturer facility or may be used in the field proximate to the power meter 100 depending upon the implementation.

According to one embodiment, the remote computer 120 contains the upgrade firmware 122 that is to be loaded into the meter 100 in place of the existing firmware. As will be described below, the upgrade firmware 122 may be created on the remote computer 122 or on some other computer and transferred to the remote computer 122. The upgrade firmware 122 is composed of an uncompressed bootstrap portion **122*a* and a compressed new firmware portion 122*b***. Both the uncompressed portion and the compressed portion are preferably encoded in Motorola® S-record format although other formats may be used such as Intel® Hex format or binary format.

The digital power meter 100 further contains a processor 135, volatile memory, such as Dynamic RAM ("DRAM") 140, and non-volatile memory, such as flash memory 145. The flash memory 145 is used for non-volatile storage of operating code and data for the power meter 100. The DRAM 140 is used to store executing code for the power meter 100, volatile data for operation of the processor and to temporarily store data that is destined for the flash memory 145. In one embodiment, DRAM memory 140 includes four separate DRAM memories totaling about 8 MB of storage. Alternatively, a single DRAM memory 140 having equivalent capacity may be used. In another embodiment, the flash memory 145 includes two separate flash memories totaling about 8 MB of storage although a single flash memory having equivalent capacity may also be used. An exemplary processor 135 for use with the preferred embodiments is type MPC821 manufactured by Motorola Inc., located in Schaumburg, Ill., although other suitable processors may also be used. Exemplary DRAM 140 includes the type MT4C1M16E5DJ-6 manufactured by Micron Technology Inc. located in Boise, Id. Exemplary flash memory 145 includes the type LH28F320S5NS-L90 manufactured by Sharp Corporation located in Osaka, Japan. It will be appreciated that the bit densities and other characteristics of the devices used to implement the memories 140, 145 are implementation dependent. The memories 140 145 are coupled with the processor 135 such that the two flash memories **145*a* 145*b* are mapped as a single address space and the four DRAMs 140*a* 140*b* 140*c* 140*d* are mapped as a single address space separate from the flash memory 145 address space. Therefore, in the foregoing discussion they will be treated as one flash memory 145 and one DRAM 140** respectively.

The digital power meter 100 also contains a display 165, a digital signal processor ("DSP") 150, analog to digital converters ("A/Ds") 155 and additional circuitry 160 which are configured in a manner known in the art. Additional circuitry 160 can consist of power supplies, digital inputs and outputs, analog inputs and outputs, external display interfaces, etc.

Figure 2:
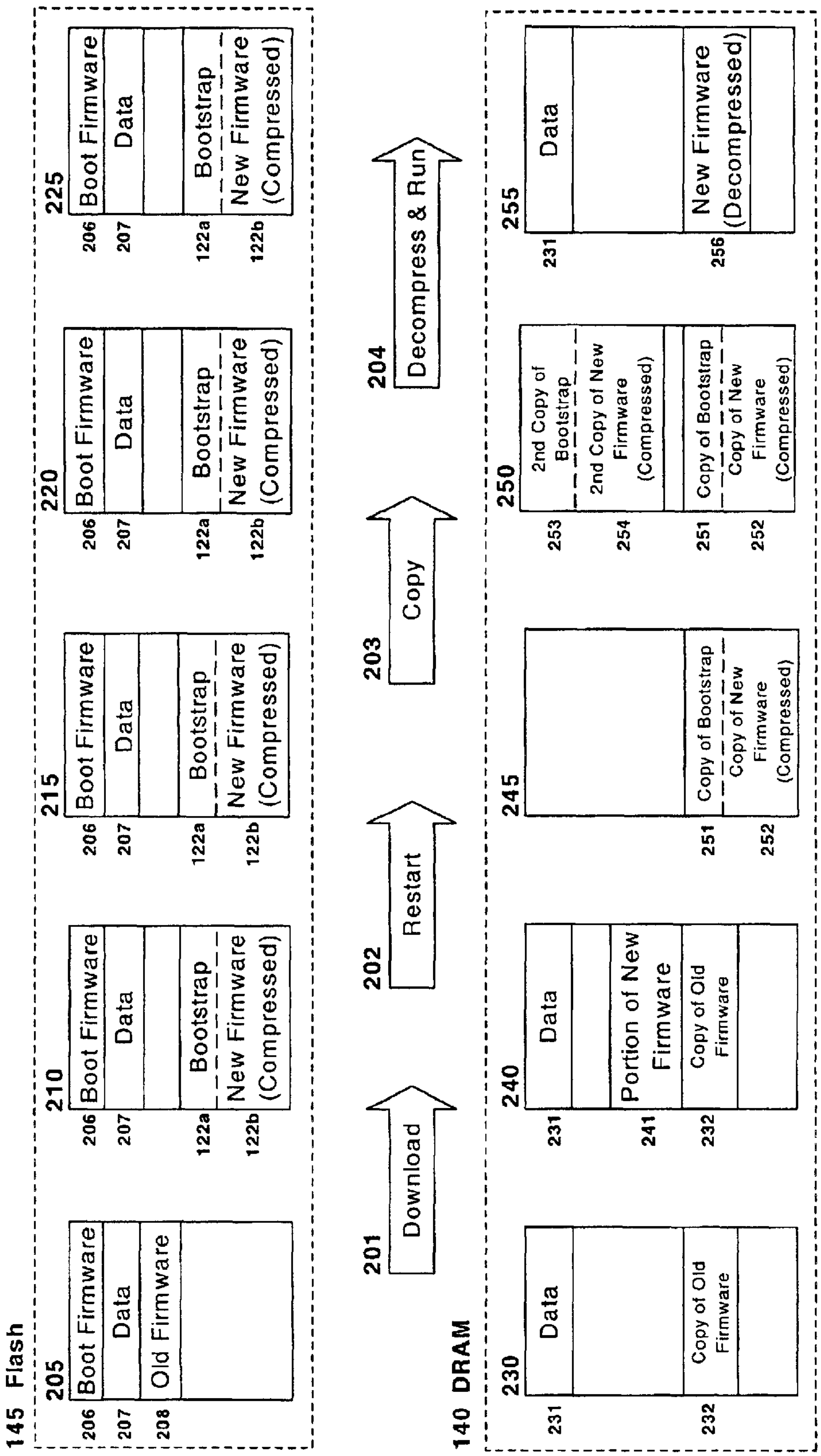
FIG. 2 illustrates an event diagram illustrating an upgrade process for use with the embodiment of FIG. 1.
Figure 3:
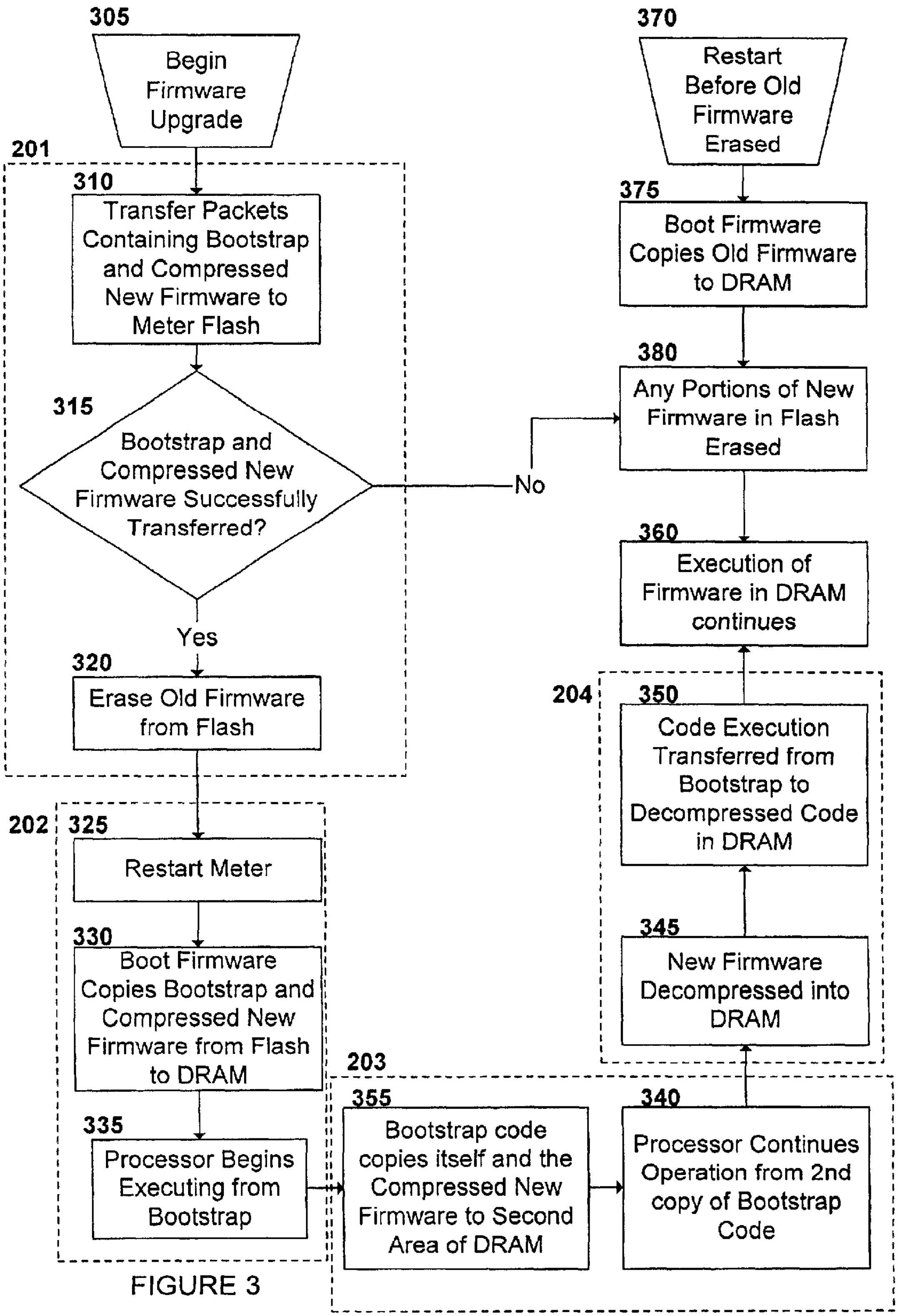
FIG. 3 illustrates a flow chart of the firmware upgrade process for with the embodiment of FIG. 1.

FIG. 2 illustrates an exemplary method for upgrading the contents of the Flash 145 and DRAM 140 memories according to one embodiment. To upgrade the meter 100, a user utilizing a remote computer 120, 121, 124 connects to the meter 100 via interfaces 115, 125, 130 as described. For the purposes of this discussion, these initial steps of connecting to the meter are not shown but may include establishing a data connection between the meter 100 and the remote computer 120, 121, 124, logging in to the meter or otherwise authenticating/securing communications and executing an upgrade process. It will be appreciated that other actions may be necessary to establish communications with the meter 100 for the purposes of initiating a firmware upgrade and that such actions are implementation dependent. Once communications have been established and the upgrade process has been initiated, the upgrade process has four stages: Download 201, Restart 202, Copy 203 and Decompress and Run 204. The contents of the DRAM 140 and Flash 145 memories, before and after each of these stages, is also diagrammed in blocks 205 210 215 220 225 230 240 245 250 255. Simultaneously referring to FIG. **3*a*, a flowchart of the upgrade process is illustrated. When the upgrade process begins, block 305, the flash 145 contains boot firmware 206, non-volatile data 207, and the old firmware 208 used to execute the functions of the power meter 100 such as those described previously. At this point, the DRAM contains volatile data 231 and a copy of the old firmware 232** that the power meter 100 is currently executing. Volatile data 231 includes such things as device setup information, event logs, data logs and waveform captures, internal processor stack space and general variable storage in use by the processor. Non-volatile data 207 includes such things as device setup information, event logs, data logs and waveform captures which may be different from, a superset, subset or combination thereof of volatile data 231.

As the firmware upgrade process continues, the bootstrap code 122*a* and compressed new firmware 122*b* are transferred from the remote computer 120, 121, 124 to the meter 100 over the communications interface 115. In one embodiment, the transfer is accomplished by breaking the bootstrap code 122*a* and compressed new firmware 122*b* into multiple packets which are individually transmitted, each packet containing a portion of the data to be transferred. Such packet based communications protocols are well known. Alternatively other data transfer protocols, now available or later developed, may be used, for example the bootstrap code 122*a* and compressed new firmware 122*b* may be transferred as a continuous data stream over the communications interface 115. The processor 135 receives the packets, acknowledges the receipt and stores the portions of the transferred bootstrap code 122*a* and compressed new firmware 122*b* from the packets into DRAM memory 140. In one embodiment, error detection and/or correction data is also exchanged between the meter 100 and the remote computer 120, 121, 124 to ensure proper receipt of the packets. This results in portions 241 of the bootstrap 122*a* and compressed new firmware 122*b* being transferred into DRAM memory 140. As they are received, these portions are then continuously written to the flash memory 145 by the processor 135 until the entire bootstrap 122*a* and compressed new firmware 122*b* are stored into the flash 145. In an alternate embodiment, the entire bootstrap code 122*a* and compressed new firmware 122*b* is received into the DRAM memory 140 and then it is transferred to the flash memory 145. A test is done (via a Cyclic Redundancy Check ("CRC")) to ensure that the bootstrap 122*a* and compressed new firmware 122*b* were successfully transferred, block 315. Alternatively, other error checking and/or correction algorithms may also be used. If the transfer was not successful, execution of the firmware in the power meter 100 continues, block 380. In this case, it is the copy of the old firmware 232 that continues to execute in block 360 and the upgrade firmware 122 is discarded. Until the power meter 100 is restarted, the processor is executing code from the old firmware 232 a portion of which executes the upgrade process for the meter 100.

If the bootstrap 122*a* and compressed new firmware 122*b* were successfully transferred, the old firmware 208 is erased from the flash 145, block 320, the file system within the flash is updated to indicate that the location of the main firmware is where the bootstrap 122*a* was written to the flash and the power meter 100 is restarted, block 325. These functions are provided by the upgrade and flash file and/or memory management routines in the existing executing firmware. The power meter 100 continues to perform its normal functions in addition to receiving the upgrade firmware 122 until it restarts. After the old firmware 208 is erased from the flash 145, block 320, the power meter 100 is automatically restarted, block 325 by the processor 135. Before restarting, the processor 135 stores any portion of the data 231 that must be saved into the data 207 area of the flash 145. After restart, the bootstrap 122*a* and compressed new firmware 122*b* are copied/transferred, block 330, by the boot firmware 206 to the DRAM memory 140 resulting in a copy of the bootstrap 251 and compressed new firmware 252 in the DRAM memory 140. The start address of the bootstrap 122*a* is set to be the same as the old firmware 208. Therefore, the boot firmware 206, which has not been changed, does not need to know that the new firmware 122*b* is compressed and does not need to be aware that the bootstrap 206 and new firmware 122*b* combination is any different than the old firmware 208. The processor execution then transfers to the copy of the bootstrap 251, block 335. The copy of the bootstrap 251 copies itself and the copy of the compressed new firmware 252 to a second area of the DRAM memory 140, block 355, resulting in a second copy of the bootstrap 253 and compressed new firmware 254 and transfers execution to this copy, block 340. The second copy of the compressed new firmware 254 is then decompressed by the second copy of the bootstrap 253, block 345, into the same location where the copy of the old firmware 232 was in the DRAM memory 140 before the restart. The bootstrap 253 contains the necessary code for decompressing the new firmware 122*b*. The compression/decompression algorithm is described below. This results in a decompressed version of the compressed new firmware 122*b* in the DRAM 140. Then, code execution is transferred to the decompressed new firmware 256, block 350, and execution continues, shown in block 360. The end result is that the power meter is now executing new code from DRAM from the same location as the copy of the old firmware 232 was located. Further, the code (now the upgrade firmware 122) stored in the flash memory 145 is now compressed thereby reducing its storage requirements.

If the power meter 100 restarts, block 370 before the old firmware 208 is erased at block 320, the boot firmware 206 copies the old firmware 208 from the flash 145, block 375, any portion of upgrade firmware 122 in the flash 145 is erased, block 380 and execution of the copy of the old firmware 232 continues as though no upgrade had occurred. After the upgrade process has completed, any further restarts of the firmware due to power cycling or resets results in the execution of blocks starting at block 325.

If there is a restart of the power meter 100 (due to a power cycle or other interruption to code execution) before the erasure of the old firmware 208 at block 384, execution continues at block 388 with the old firmware 208 being copied to the DRAM 140. Then, any partial portions of the new uncompressed firmware are erased, block 390 and execution of the old firmware 208 continues, block 391. It is important to note that if the upgrade process completes successfully, the upgrade firmware 122 becomes the old firmware 208 for the next upgrade of the device.

It will be apparent to those skilled in the art that it is not necessary to store the new firmware in the flash memory 145 in compressed form. In one embodiment, the firmware is decompressed after it is downloaded and stored in the flash memory 145 in an uncompressed form. However, storing it in compressed form saves space in the flash memory 145 for larger upgrades and/or additional data 207. This data may include logs, device setup and waveform recording data. Further, if the device did not have a file system for managing the non-volatile memory 145 (and therefore, the firmware must reside in a fixed flash location), it would be possible to download the entire upgrade firmware 122 to DRAM 140 and then erase the old firmware 208 in flash 145 before writing the decompressed new firmware into flash 145, but this would leave the device vulnerable to a power shutdown while the upgrade firmware 122 was being transferred to the flash 145. In addition, in a similar fashion, it would be possible to have the boot firmware 206 overwritten with upgrade firmware, but this would leave the device vulnerable to a power shutdown during the upgrade process as well. In either case, a power interruption with the firmware incompletely stored would result in an inoperable meter 100. In the disclosed embodiment, the risk of an unexpected power shutdown leaving the device inoperable is mitigated by the fact that the old firmware 208 is not erased until the upgrade firmware 122 is successfully stored in the flash 145. Temporarily, after the upgrade firmware 122 is completely stored in the flash 145, both the upgrade firmware 122 and the old firmware 208 are simultaneously stored in the flash memory 145. A pointer or other appropriate means is then changed in the flash 145 so the bootstrap 206 knows to boot from the upgrade firmware 122 instead of the old firmware 208. This pointer is changed by the processor 135 just before the old firmware 208 is erased.

In an alternative embodiment, as the upgrade firmware is received, it is stored directly into the flash memory. In this embodiment, the flash memory has a minimal write cycle time allowing it to store the data as it is received, at wire speed. Therefore portions of the new code 241 need not be written/buffered into the DRAM 140 during the upgrade process. Instead they can be written directly into the flash 145. This eliminates the need for buffer memory space in the DRAM 140 and also further speeds up the upgrade process. In an alternate embodiment, dedicated buffer memory separate from the DRAM 140 is provided to buffer the upgrade firmware data as it is received while it waits to be stored into the flash memory 145.

Further, flash memory 145 capable of simultaneous reading and writing may also be used permitting execution of code directly from one portion of the flash memory 145 while storing data into another portion of the flash memory 145 further eliminating reliance on volatile storage such as the DRAM 140.

In the preferred embodiment, the new firmware is compressed using the zlib algorithm disclosed in the "zlib 1.1.3 Manual" available at http://www.gzip.org/zlib (last accessed Jan. 14, 2002), written by Jean-loup Gailly and Mark Adler. Alternatively, other compression algorithms may also be used.

Figure 4:
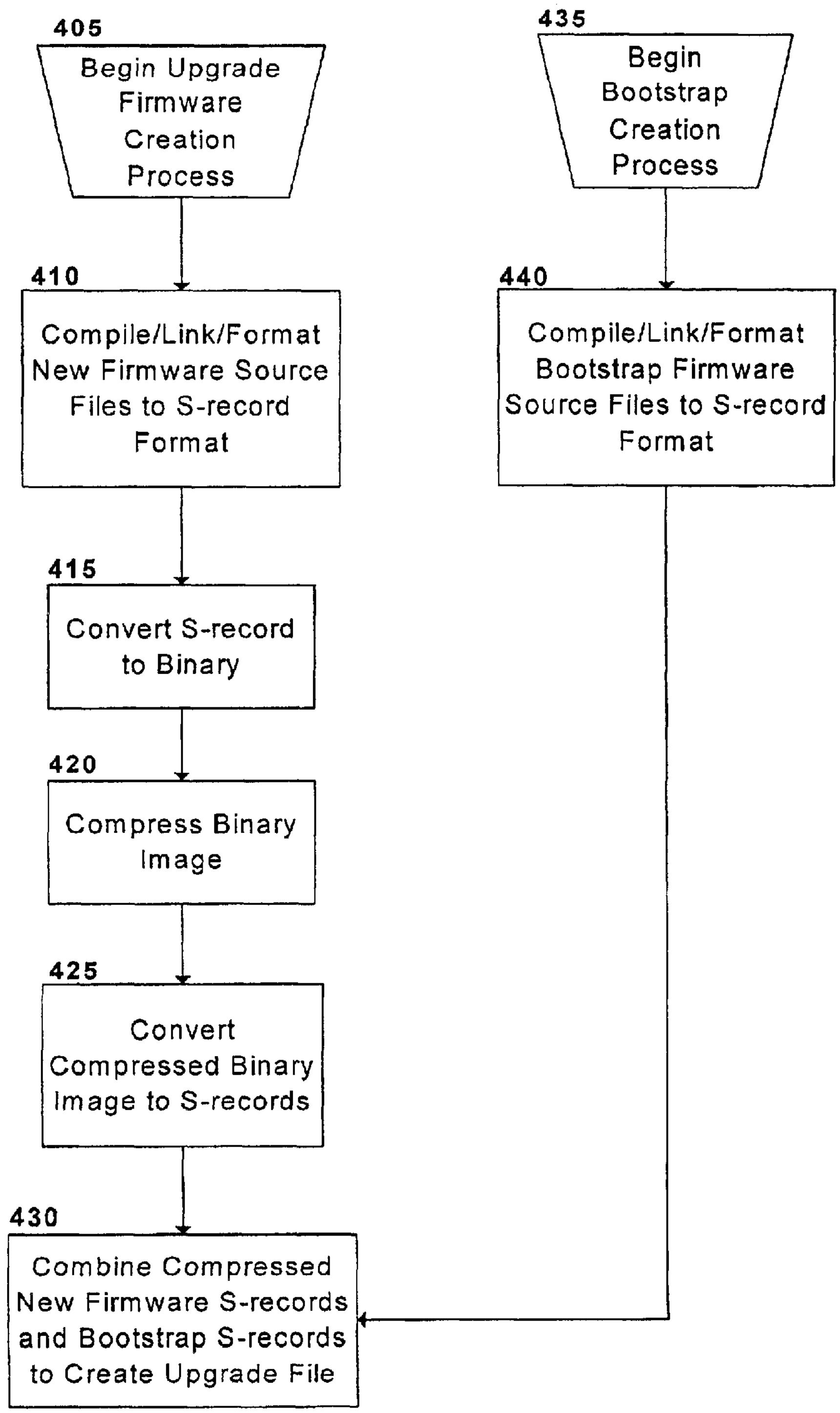
FIG. 4 illustrates a flow chart of the upgrade firmware creation process for creating a firmware upgrade for use with the embodiment of FIG. 1.

FIG. 4 illustrates the process executed in the remote computer 120 121 124 in order to create the upgrade firmware 122 described above. When the new firmware creation process begins, block 405, the source files for the new firmware are compiled, linked and formatted into S-record format, block 410. The S-records are then converted into a binary image, block 415. This binary image is then compressed, block 420, using the zlib algorithm as described earlier. The compressed binary image is converted back into S-records, block 425. In parallel or sequentially, the bootstrap 122*a* creation process begins, block 435 and the bootstrap source files are compiled, linked and formatted into S-record format, block 440. Finally, the S-records for the compressed new firmware 122*b* and the uncompressed S-records for the bootstrap code 122*a* are combined, block 430. The result is an upgrade firmware 122 in S-record format containing both the uncompressed bootstrap code 122*a* and the compressed new firmware code 122*b*. The source files for the bootstrap code 122*a* contain the zlib decompression algorithms and therefore, once compiled, the bootstrap code incorporates and is able to execute these algorithms.

Although the upgrade file in the preceding discussion was referred to as consisting of an uncompressed "bootstrap" portion 122*a* and a compressed "new firmware" portion 122*b*, it is also possible to consider the entire upgrade file as the "new firmware" which consists of an uncompressed portion and a compressed portion.

In addition, as an alternate method, the bootstrap code 122*a* could be downloaded and executed before the new firmware 122*b* is downloaded to the device In this case, the bootstrap code 122*a* would contain code that would execute and continue the download process by downloading the new firmware 122*b*. This would allow the new firmware 122*b* to be resident in a different storage location from the bootstrap code 122*a* such as in a different remote computer 121 124 instead of remote computer 120.

It will also be apparent to those skilled in the art that the method described can also be used to save space in the flash 145 if the method is executed with a version of the new firmware 122*b* that is merely a compressed version of the old firmware 208.

Further, it will also be apparent to those skilled in the art that the data 207 231 of the present invention could also be compressed using the same methods described to further save space in the flash 145 and DRAM 140.

It is therefore intended that the foregoing detailed description be regarded as illustrative rather than limiting, and that it be understood that it is the following claims, including all equivalents, that are intended to define the spirit and scope of this invention.

We claim:

1. A method of altering firmware of an electronic device, the device comprising a processor and a non-volatile memory, the firmware comprising first data stored in the non-volatile memory, the method comprising:

receiving second data by the electronic device, the second data comprising an uncompressed portion and a compressed portion, the uncompressed portion including a decompression program;

storing at least the compressed portion in the non-volatile memory;

removing at least one portion of the first data from the non-volatile memory;

decompressing the compressed portion using the decompression program; and executing the firmware by the processor, the firmware further comprising at least the decompressed compressed portion.

2. The method of claim 1 further comprising:

receiving the decompressed compressed portion by a volatile memory.

3. The method of claim 2, wherein the volatile memory comprises RAM.

4. The method of claim 1 wherein the non-volatile memory comprises flash EEPROM.

5. The method of claim 1, further comprising:

receiving the second data in S-record form.

6. The method of claim 1, further comprising:

receiving the second data in binary form.

7. The method of claim 1, wherein the receiving further includes receiving at least one packet containing at least one portion of the second data over a communications link coupled with the electronic device.

8. The method of claim 1, wherein the storing further includes storing the compressed portion in the non-volatile memory where the at least one portion of the first data was stored.

9. The method of claim 1, the method further comprising:

compiling source code for said electronic device;

linking the source code to create object code;

formatting the object code into binary format code; and compressing the binary format code, the second data comprising the compressed binary format code.

10. The method of claim 9, wherein the compressing further comprises:

converting the compressed binary format code into S-record format code.

11. The method of claim 1, wherein the method further comprises:

storing the uncompressed portion in the non-volatile memory.

12. The method of claim 1, further comprising:

copying the decompressed compressed portion to a same location in a volatile memory where the firmware previously executed from.

13. The method of claim 12, further comprising:

moving at least a portion of the second data from the same location in the volatile memory to a new location in the volatile memory; and executing the uncompressed portion from the new location.

14. The method of claim 13, wherein the execution of the uncompressed portion in the new location further comprises decompressing the compressed portion and storing the decompressed compressed portion at the same location in the volatile memory that the firmware previously executed from.

15. The method of claim 14, wherein the electronic device computes at least one power parameter.

16. The method of claim 1, wherein the electronic device computes at least one power parameter.

17. A system for upgrading the firmware of an electronic device, the system comprising:

a computing device comprising at least a first processor and a storage device;

a communications link coupled between said computing device and said electronic device;

wherein said electronic device comprises:

a non-volatile memory comprising first firmware; and a second processor;

said computing device further comprising:

second firmware stored on said storage device, said second firmware comprising a compressed portion and an uncompressed portion;

said computing device operative to transfer said second firmware to said electronic device via said communications link and said second processor operative to execute said uncompressed portion to decompress said compressed portion; and wherein at least said compressed portion replaces at least a portion of said first firmware in said non-volatile memory.

18. The system of claim 17, wherein said electronic device further comprises a volatile memory; said volatile memory operative to receive said second firmware and said second processor operative to execute said uncompressed portion from said volatile memory.

19. The system of claim 18, wherein said second processor is operative to transfer said second firmware to a same location in said volatile memory as said first firmware was previously transferred to.

20. The system of claim 19, wherein said volatile memory comprises a RAM.

21. The system of claim 17, wherein said non-volatile memory comprises flash EEPROM.

22. An electronic device comprising:

a processor;

a communications interface coupled with said processor; and a non-volatile memory coupled with said processor and said communications interface, said non-volatile memory comprising first program code operative to be executed by said processor; and wherein said communications interface is operative to receive second program code, said second program code comprising a first uncompressed portion and a first compressed portion, said processor operative to remove a portion of said first program code from said non-volatile memory, store said first compressed portion in said non-volatile memory and execute said first uncompressed portion to uncompress said first compressed portion; and further wherein said processor is operative to execute said uncompressed first compressed portion.

23. The electronic device of claim 22, wherein said electronic device further comprises a volatile memory; said volatile memory operative to receive at least a portion of said second program code and said processor operative to execute said first uncompressed portion from said volatile memory.

24. The electronic device of claim 23, wherein said second program code is transferred to the same location in said volatile memory that said first program code previously executed from.

25. The electronic device of claim 24, wherein said volatile memory comprises a RAM.

26. The electronic device of claim 25, wherein said electronic device computes at least one power parameter.

27. The electronic device of claim 22, wherein said non-volatile memory comprises flash EEPROM.

28. The electronic device of claim 22, wherein said electronic device computes at least one power parameter.

29. An electronic device comprising:

non-volatile memory means for storing first program means for operating said electronic device;

processor means for executing said program means;

communications means for receiving second program means for operating said electronic device; and wherein said second program means further includes a first uncompressed portion and a first compressed portion, said processor means further operative to remove a portion of said first program means from said non-volatile memory means, store said first compressed portion in said non-volatile memory means and execute said first uncompressed portion to uncompress said first compressed portion; and further wherein said processor means is operative to execute said uncompressed first compressed portion.

30. The electronic device of claim 29, wherein said non-volatile memory means is operative to receive said first uncompressed portion.

31. The electronic device of claim 29, wherein said electronic device comprises power parameter calculation means.

32. The electronic device of claim 22 further comprising analog interface circuitry coupled with said processor and operative to monitor at least one parameter of an electric circuit.

33. The electronic device of claim 28 further comprising analog interface circuitry coupled to said processor and operative to monitor at least one parameter of an electric circuit, said at least power parameter being computed based thereon.

34. The electronic device of claim 22 wherein said non-volatile memory comprises a ferro-electric memory.

35. The electronic device of claim 34 wherein said ferro-electric memory comprises magnetic random access memory ("MRAM").

36. The electronic device of claim 22 wherein said second program code comprises a Basic Input Output System ("BIOS").

37. The electronic device of claim 22 wherein said second program code comprises communications code for facilitating communication with an external device.

38. The electronic device of claim 22 wherein said second program code comprises user interface code.

39. The electronic device of claim 22 wherein said communications interface comprise at least one of Ethernet, RS-485, RS-232 and modem.

40. The electronic device of claim 22 wherein said communications interface comprises a wireless link.

41. The method of claim 1 further comprising:

coupling said electronic device via analog interface circuitry to an electric circuit; and monitoring at least one parameter of said electric circuit.

42. The method of claim 1 wherein said non-volatile memory comprises a ferro-electric memory.

43. The method of claim 42 wherein said ferro-electric memory comprises magnetic random access memory ("MRAM").

44. The method of claim 1 wherein said second data comprises a Basic Input Output System ("BIOS").

45. The method of claim 1 wherein said second data comprises communications code for facilitating communication with an external device.

46. The method of claim 1 wherein said second data comprises user interface code.

47. The method of claim 1 wherein said receiving comprises communicating over at least one of an Ethernet interface, an RS-485 interface, and RS-232 interface and a modem.

48. The method of claim 1 wherein said receiving comprises communicating over a wireless link.

* * * * *